United States Patent [19]

Gregor

[11] Patent Number: 4,921,090

[45] Date of Patent: May 1, 1990

[54] VIBRATORY CONVEYOR

[75] Inventor: Vaughn Gregor, Beverly Hills, Calif.

[73] Assignee: FMC Corporation, Chicago, Ill.

[21] Appl. No.: 289,507

[22] Filed: Dec. 22, 1988

Related U.S. Application Data

[63] Continuation of Ser. No. 13,222, Feb. 6, 1987, abandoned, which is a continuation of Ser. No. 873,046, Jun. 3, 1986, abandoned, which is a continuation of Ser. No. 593,215, Mar. 26, 1984, abandoned.

[51] Int. Cl.$^5$ .............................................. B65G 27/32
[52] U.S. Cl. ................................... 198/761; 198/769; 313/128; 313/129
[58] Field of Search ............... 198/761, 762, 751, 769; 318/128, 129, 130, 132

[56] References Cited

U.S. PATENT DOCUMENTS

| | | |
|---|---|---|
| 2,259,565 | 10/1941 | Hutcheson . |
| 2,287,223 | 6/1942 | Baird ...................... 318/129 X |
| 2,322,217 | 6/1943 | Baird ...................... 318/128 |
| 2,444,134 | 6/1948 | Hittson . |
| 2,585,719 | 2/1952 | Alvord . |
| 2,654,466 | 10/1953 | Spurlin . |
| 2,918,590 | 12/1959 | Gilbert . |
| 2,926,773 | 3/1960 | Alvord . |
| 3,149,255 | 6/1964 | Trench . |
| 3,322,260 | 5/1967 | Schwenzfeier ............. 198/769 X |
| 3,336,488 | 8/1967 | Scott . |
| 3,366,809 | 1/1968 | Scott . |
| 3,400,316 | 9/1968 | Kuschel ..................... 318/129 X |
| 3,518,463 | 6/1970 | Abbott . |
| 3,731,787 | 5/1973 | Gregor . |
| 4,053,817 | 10/1977 | Yeasting . |
| 4,101,816 | 7/1978 | Shepter ..................... 318/130 |
| 4,229,288 | 10/1980 | Akama . |
| 4,331,263 | 5/1982 | Brown ....................... 198/751 X |
| 4,350,243 | 9/1982 | Weyandt .................... 318/128 X |
| 4,371,800 | 2/1983 | Brander . |
| 4,401,925 | 8/1983 | Brander ..................... 318/128 X |
| 4,441,060 | 4/1984 | Hamer et al. ............... 318/128 X |
| 4,490,654 | 12/1984 | Buchas ....................... 318/130 |
| 4,544,867 | 10/1985 | Jones, Jr. et al. .......... 318/129 |

FOREIGN PATENT DOCUMENTS 776699  6/1957  United Kingdom ............ 198/769

Primary Examiner—Robert J. Spar
Assistant Examiner—D. Glenn Dayoan
Attorney, Agent, or Firm—Edward J. Lynch; Raymond E. Parks; Richard B. Megley

[57] ABSTRACT

A drive and drive controller for a vibratory conveyor, wherein the drive comprises a pair of pole pieces offset along a direction of action of the drive, and moveable in the direction of action of the drive when energized by a power signal. Preferably, one of the pole pieces is mounted to a tray portion, and the other to a kinetic balancer portion, of the conveyor. The power signal comprises a series of pulse trains of controllable frequency and duration, whereby the drive unit may be vibrated at a controllable frequency and amplitude so that the vibratory conveyor may be readily tuned to optimal performance. Optionally, the voltage level of the power signal may be reduced by an autotransformer in series with the power signal to independently control the power level.

26 Claims, 4 Drawing Sheets

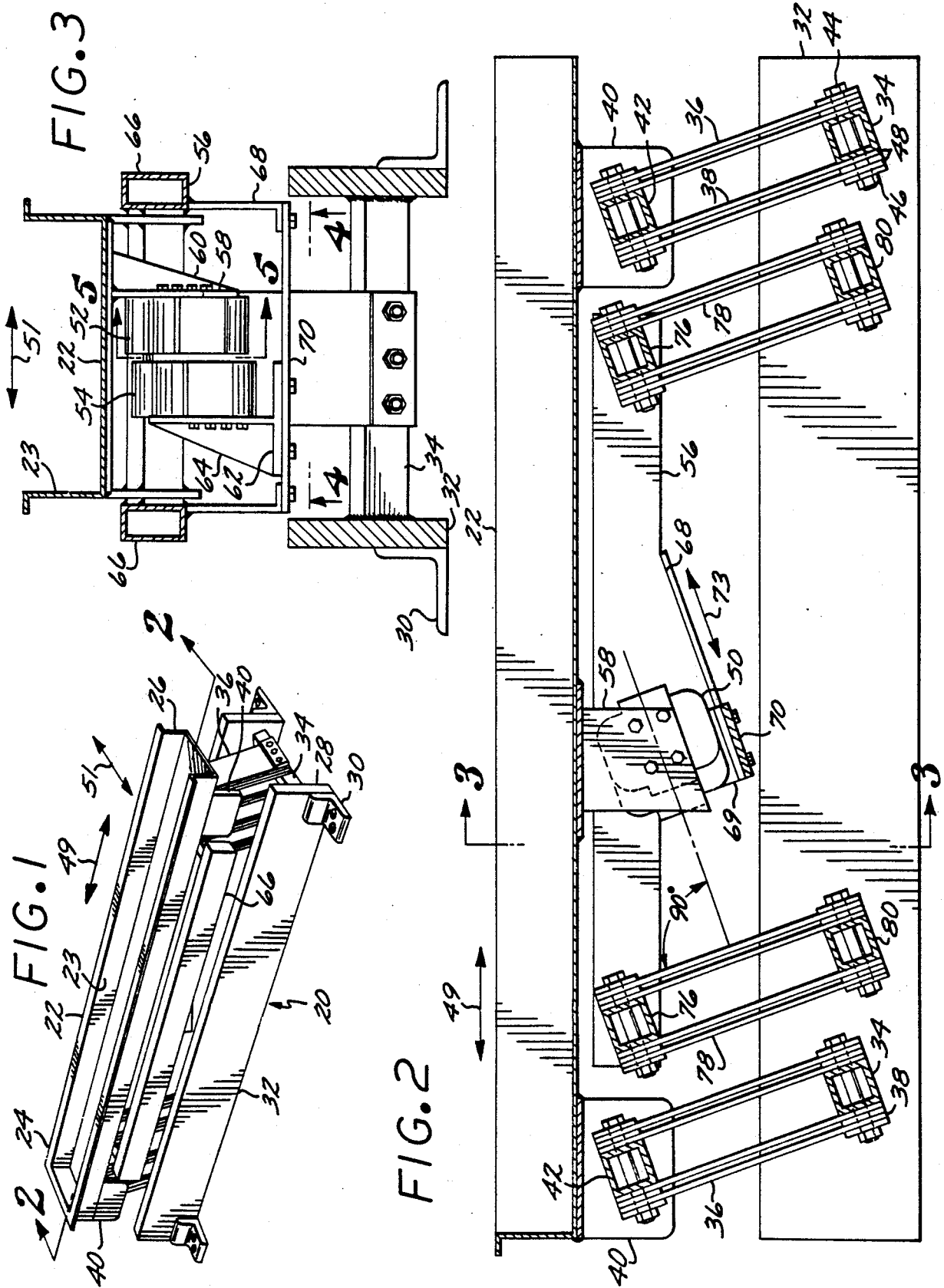

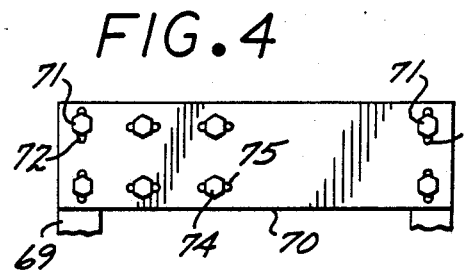
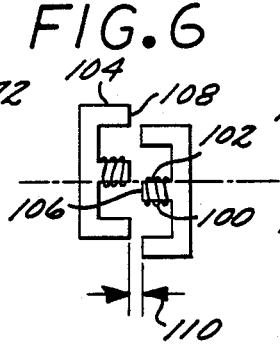
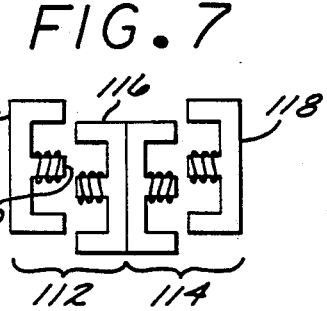
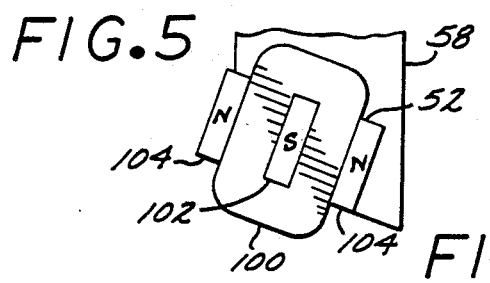
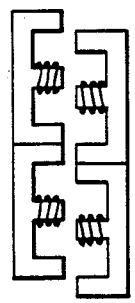
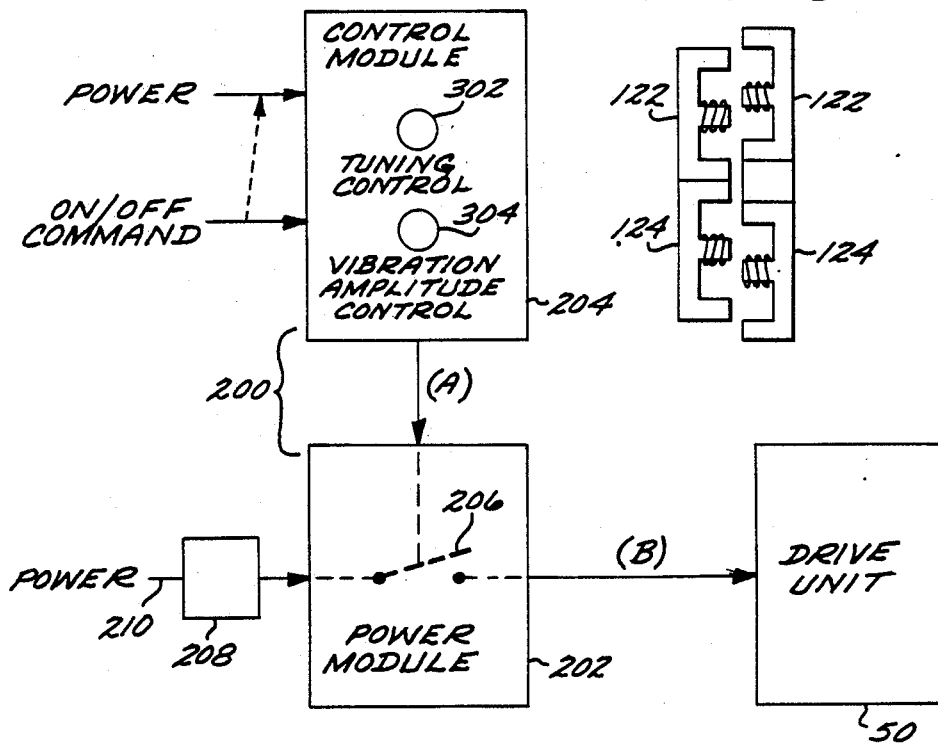
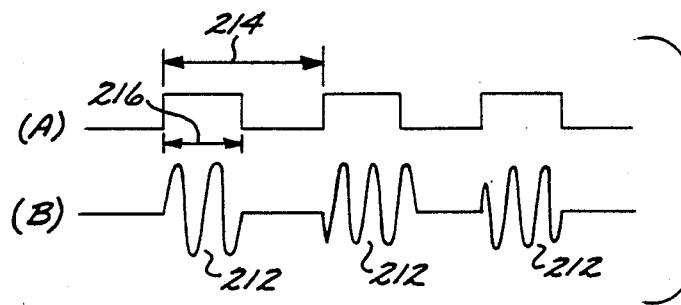

VIBRATORY CONVEYOR

This application is a continuation of application Ser. No. 013,222, filed Feb. 6, 1987, now abandoned, which is a continuation of S.N. 873,046 filed June 3, 1986, now abandoned, which in turn is a continuation of 593,215 filed Mar. 26, 1984 now abandoned.

BACKGROUND OF THE INVENTION

This invention relates to vibratory conveyors, and, more particularly, to a drive and drive controller system for powering such a vibratory conveyor.

Vibratory conveyors are used industrially to move fragile, small, or light weight articles from one point to another. For example, in the packaging of fragile food products such as cookies or potato chips, the food product is received from a central location such as a cooking oven and is conveyed to a plurality of work stations, whereat a packaging machine fills and seals a package with the food product. The vibratory conveyor system is necessary because the food products are fragile and may not be readily grasped at this stage of production. An example of a vibratory conveyor used in this fashion is provided in U.S. Pat. No. 3,731,787.

One type of vibratory conveyor includes a frame, a tray for receiving a product, the tray being mounted to the frame by a resilient means usually comprising a flexure inclined to the vertical, and a drive system to vibrate the tray within the path defined by the flexure. An article resting on the tray is thrown forward in the direction of conveyance with each cycle of the drive system. The tray is typically vibrated at a rate of 600–1400 cycles per minute, and an article resting on the tray experiences an equal rate of throws or vibrational impulses.

A variety of approaches have been used to provide the vibratory motion in such conveyors. In one approach, the rotary motion of a conventional rotary motor is converted to linear motion by an eccentric mechanical linkage. Such an approach has significant disadvantages, particularly as to noise created by the drive system, wear of the linkage, and the need to lubricate the moving parts. The necessity of introducing lubricants into a clean environment such as used to convey food products is highly undesirable. In one alternative approach, termed a direct-attraction drive, the use of an eccentric mechanical linkage is avoided by providing a drive having two pole pieces, one attached to the frame of the conveyor and the other attached to the tray. In a direct-attraction drive, the flat faces of the pole pieces are perpendicular to the direction of action of the drive. One of the pole pieces may be permanently magnetized or magnetized by a direct current, and the other is an electromagnet alternately magnetized and demagnetized by an alternating current in a coil wound on the pole piece, so that the two pole pieces are alternately drawn together and allowed to relax apart under the restoring force of the flexure. With this arrangement, the amplitude of vibration is relatively fixed by the initial spacing between the pole pieces. The length of travel of the pole pieces is not inherently self-limiting, so that the two pole pieces may clap together, causing significant damage to the drive.

To overcome the problems associated with such drives, some principles of linear drives have been adapted to vibratory conveyors. In a linear drive, two pole pieces whose flat faces are parallel to the direction of action of the drive move parallel to each other while maintaining a relatively constant lateral spacing. The motive force is provided by alternately magnetizing and demagnetizing one of the pole pieces to attract the pole pieces toward each other along the direction of action, thereby producing motion parallel to the direction of action of the drive. The amplitude of the vibration may be significantly increased over that of conventional direct-attraction drives, and various modifications have been proposed to the design of the pole pieces to further increase the available vibrational amplitude.

While the various means to provide vibration to vibratory conveyors have certain advantages, all prior drives suffer from the common disadvantage of a lack of complete controllability. Use of a rotary motor allows the frequency of vibration to be readily controlled by adjusting the motor speed, but the amplitude of the vibration is not readily controlled, except by changing the linkage and eccentric mechanically. In the conventional direct-attraction drive, and the conventional linear drive, operating from available 50 or 60 cycle alternating current, the vibrational frequency may not be readily controlled. There have been a few attempts to utilize complex electronics to vary the frequency of the vibration, but for the most part the vibrational frequency has been limited to that produced by a motor operating at 50 or 60 cycles per second, or an integral fraction thereof, and vibrating a supported mass (the tray). It is highly desirable to have the ability to drive the tray at or near its natural frequency, as the power requirements of the conveyor are thereby reduced. The lack of complete controllability of prior vibrating conveyors thus does not permit an optimal conveying of the articles in the tray, and causes inefficiencies.

For some applications, the vibratory conveyor works satisfactorily even without complete control of vibrational amplitude, frequency and power input. In other applications such complete control would be desirable to tune the conveyor to minimize the required input power, while optimizing the control of movement of the product. Accordingly, there exists a need for a drive and drive controller system for use with vibratory conveyors, to provide an energy efficient power source wherein amplitude, frequency, and power input may be readily and arbitrarily controlled using reliable apparatus elements. The present invention fulfills this need and further provides related advantages.

SUMMARY OF THE INVENTION

The present invention resides in a vibratory conveyor including a drive and drive controller having the advantages of prior apparatus, but also allowing broad flexibility in the control of frequency, amplitude, and power input, with optimum energy efficiency and control of the article movement in a tray of the conveyor. The drive and associated drive controller have no moving mechanical linkages, eliminating the need to lubricate and reducing the noise level of the conveyor. Simple, fingertip adjustments on the drive controller allow the continuous variation of the frequency, amplitude, and power level, without simultaneously varying others of these parameters and also without turning the conveyor off or making any mechanical alterations. The operator therefore has complete flexibility to fine tune the conveyor to particular structure, product types, flow rates, and energy use.

In accordance with the present invention, a vibratory conveyor includes a drive system comprising a drive and drive controller, the drive controller having means for providing a periodically repeating pulse train power signal to the drive, the frequency, duration, and power level of the power signal being controllable. The drive comprises a pair of pole pieces whose faces are parallel to the direction of action of the drive, so that the faces of the respective pole pieces are parallel to each other but offset in the direction of action of the drive. Preferably, one of the pole pieces is mounted to the tray of the vibratory conveyor, and the other to a kinetic balancer portion. Upon activation of the power signal the pole piece faces move parallel to each other in the direction of action. The pole pieces are simultaneously energized by the power signal.

In a preferred embodiment, the power supplied to the drive controller is conventionally available 50 or 60 cycles per second alternating current (AC). The drive controller comprises a control module and a power module, the power module including a relay to activate and deactivate the alternating current periodically to produce the pulse-train power signal to the drive. The relay is controlled by reliable, relatively simple digital logic means in the control module, such means allowing controlled variation of the closing and opening of the relay. The length of time between successive closings of the relay determines the frequency of the drive and thence the frequency of vibration of the vibratory conveyor, while the length of the time the relay is closed on each cycle determines the length of the stroke or amplitude of the vibration of the vibratory conveyor, within the limits of pole piece design in the drive.

More specifically, in this preferred embodiment the drive controller produces a power signal constituting a series of pulse trains to the drive. Each pulse of the pulse train comprises an AC signal of whatever type is supplied by the available power, usually 60 cycle AC in the United States, and 50 cycle AC in many foreign countries. By controlling the frequency and duration of the pulses in the pulse train, rather than attempting to modify the frequency of the alternating current, it is possible to control the power signal to the drive to tune the impulses of the drive to the natural resonant frequency of the tray and resilient means. The ability to tune the system is therefore not limited to mechanically changing the weight of the tray or the stiffness of the resilient means, as in the prior art, but may instead be accomplished electronically with arbitrary variations in the pulse train of the power signal. Further, the optional provision of variable autotransformer means in the drive controller allows variation of the voltage or height of the pulse trains, in the preferred embodiment this corresponding to variation in the voltage of the alternating current signal, to control the total power input to the drive independently of the frequency and amplitude. Accordingly, the mechanical parts of the vibratory conveyor, including the tray and the flexures, may be optimally designed to carry particular articles, while tuning of the vibrational action may be accomplished entirely by the drive and drive controller system. Such control is achieved electronically while the system is in operation, so that the operator can observe the motion of the articles and the power level required, and continuously adjust the drive controller so as to minimize power consumption by the vibratory conveyor while simultaneously optimizing the conveyance function.

It will be appreciated from the foregoing that the present invention represents a significant advance in the field of vibratory conveyors. By powering the drive of the conveyor with a succession of pulse trains, tuning of the system is no longer limited to making mechanical modifications of the moving parts, while operating within constraints defined by the available alternating current power. Large amplitudes of vibratory motion may be controllably achieved, in conjunction with the ability to continuously retune the frequency of vibration and power level, again so that optimal conveyance of articles may be achieved with minimal power consumption. The apparatus of the present invention is quiet and requires no lubrication because the drive system has no mechanical parts or linkages. It may be operated using any normal alternating or direct current without significant modification. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a perspective view of a vibratory conveyor made in accordance with the present invention;

FIG. 2 is an enlarged, partially sectioned side view of the vibratory conveyor of FIG. 1, taken generally along line 2—2 of FIG. 1;

FIG. 3 is an enlarged, partially sectioned end view of the vibratory conveyor of FIG. 1, taken generally along line 3—3 of FIG. 2;

FIG. 4 is an enlarged bottom view of a detail of the vibratory conveyor of FIG. 1, taken generally along line 4—4 of FIG. 3;

FIG. 5 is a further enlarged side view of one pole piece of the drive of the vibratory conveyor of FIG. 1, taken generally along line 5—5 of FIG. 3;

FIG. 6 is a schematic illustration of one embodiment of a pole piece design of the drive, for pulsing the vibratory conveyor tray unidirectionally, having a single pair of pole pieces;

FIG. 7 is a schematic illustration of a second embodiment of a pole piece design having side-by-side, bilaterally symmetric pole pieces;

FIG. 8 is a schematic illustration of a third embodiment of a pole piece design, having an end-to-end configuration with multiple coils on each pole piece;

FIG. 9 is a schematic illustration of one embodiment of a drive controller, whereby the drive is driven in one direction;

FIG. 10 is a schematic illustration of electrical signals produced by the drive controller of FIG. 9;

FIG. 15 is a schematic illustration of a pole piece design for pulsing the vibratory conveyor tray in both forward and reverse directions.

DETAILED DESCRIPTION OF THE PREFERRED EMBODIMENT

Figure 11:
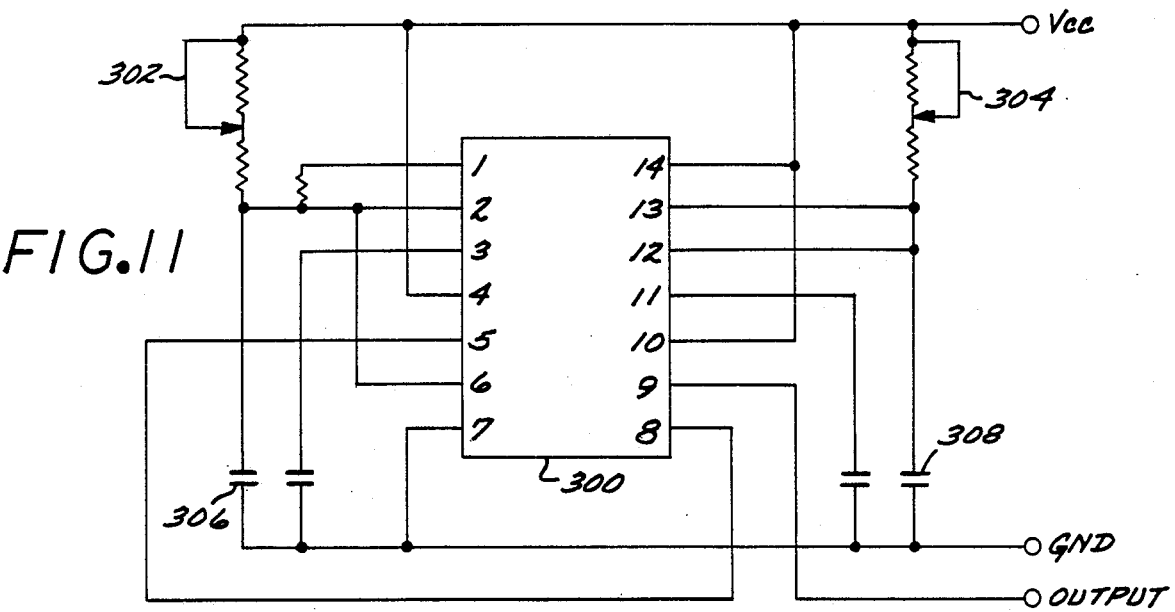
FIG. 11 is a circuit diagram of one embodiment of the pulse train control circuitry of the drive controller, for driving the drive in one direction.

As best illustrated in FIGS. 1-3, the present invention is embodied in a vibratory conveyor, generally denoted by the numeral 20. The vibratory conveyor 20 includes a tray 22 for receiving and vibratorily conducting material (not shown) from one end of the tray 22 to the other. As illustrated, the tray 22 is preferably in the form of a U-shaped trough having side walls 23 which confine movement of the articles generally to the intended direction. In the embodiment illustrated in FIG. 1, material is dropped into an input end 24 and then vibratorily conveyed along the tray 22 to a delivery end 26, at which point the material is provided to other machinery (not shown) such as a packaging machine, a processing machine or another vibratory conveyor. The tray 22 further includes two pairs of ears 40, extending downwardly from each side of each end of the tray 22. A tray transverse reinforcement 42 is fixed, as by welding, between the pair of ears 40 at each end of the tray 22, so that the tray transverse reinforcement 42 extends across the width of the tray 22 to strengthen and stiffen the tray 22, and also to serve as the member supporting the tray 22, as will be described. The tray transverse reinforcement 42 is preferably a square tubular steel section.

The vibratory conveyor 20 includes a frame 28 which serves as a base that sits on a floor or is attached to a floor or other structure by bolts passing through L-shaped attachments 30 welded to the frame 28. The frame is typically constructed of steel plates and sections. In the illustrated embodiment, the frame includes steel plate side pieces 32 connected together by a plurality of transverse spacers, including a pair of outer transverse spacers 34 and a pair of inner transverse spacers 80, which are welded at either end to the side pieces 22. The transverse spacers 34 and 80 are preferably hollow square steel sections providing rigidity and strength to the frame 28, while at the same time being weldable and relatively light in weight. The frame 28 provides a base for supporting the rest of the structure of the vibratory conveyor 20, and must have sufficient strength and vibration resistance for this purpose.

The tray 22 is attached to, and resiliently supported by, the frame 28 by resilient tray support means, preferably a pair of tray flexures 36, one adjacent the input end 24 and the other adjacent the delivery end 26. Each tray flexure 36 is preferably formed of two pairs of resilient material such as the preferred fiberglass sheets 38, each pair of fiberglass sheets being attached at one end thereof to one side of the outer transverse spacer 34, thereby connecting the fiberglass sheets 38 to the frame 28, and at the other end to the tray transverse reinforcement 42, thereby connecting the fiberglass sheets 38 to the tray 22.

The tray flexure 36 is preferably attached by identical attachment means to the frame transverse spacer 34 and the tray transverse reinforcement 42, the means including an externally threaded bolt 44, a corresponding nut 46, and four washers 48. As illustrated in FIG. 2, the stacking sequence for the attachment of the tray flexures 36 to the frame transverse spacer 34 (and tray transverse spacer 42) is head of the bolt 44, one washer 48, one fiberglass sheet 38, another washer 48, another fiberglass sheet 38, the frame transverse spacer 34, another fiberglass sheet 38, another washer 48, another fiberglass sheet 38, another washer 48, and the nut 46.

The function of the tray flexures 36 is both to support the tray 22 on the frame 28, and also to provide a restoring force when the tray 22 is displaced from its neutral position. In FIG. 2, the tray 22 is illustrated in a neutral or rest position, there being no external force imposed upon the tray 22. If the tray 22 is displaced from this neutral position along an axis of vibration 49 by an external force, the resilient tray support means, herein illustrated as tray flexure 36, resists that displacement and the displacing force with progressively increasing resistance, thereby providing a restoring force which urges the tray 22 back toward its neutral position. If the applied external force is released, the tray 22 moves back towards its neutral position, but will overshoot the neutral position due to its inertia and thence be displaced in the opposite direction along the axis of vibration 49. The resilient tray support means then resists this opposite displacement with a restoring force, so that the tray 22 oscillates about the neutral position until friction causes the tray 22 to return to the neutral position at rest.

The mass of the tray 22 and the structure and stiffness of the flexures 36 determine a natural frequency of the oscillation of the tray 22. If the external force is momentarily but periodically reapplied synchronously with the oscillation, the tray 22 will continue to oscillate at about this natural frequency, with minimal further power input through the external force. The force, which in the case of the vibratory conveyor 20 is applied by a drive unit 50, may be applied unidirectionally in a forward direction or bidirectionally in the forward and reverse directions parallel to the axis of vibration 49.

The tray flexures 36 resist any displacement of the tray 22 along a transverse axis 51, the transverse axis 51 being defined as the axis perpendicular to the axis of vibration 49, but in the horizontal plane. The tray flexures 36 are therefore preferably of a plate-like construction, that resist deformation in the plane of the plate but may be flexed perpendicular to the plane of the plate. The tray flexure 36 may be constructed of any appropriate material, with fiberglass having first preference, and steel or neoprene having second preference. The materials of construction and the configuration and number of flexures may be varied to alter the stiffness of the resilient tray support means, and such variations are known to those skilled in the art.

The drive means 50 for the vibratory conveyor 20 vibrates the tray 22 relative to the frame 28 along the axis of vibration 49. Various arrangements for the drive means 50 are possible. For example, one portion of the drive means 50 may be rigidly fixed to the frame 28, and another portion fixed to the tray 22. However, in accordance with the presently preferred and illustrated embodiment of the invention, one part of the drive means 50 is resiliently supported by the frame 28, and another part of the drive means 50 is fixed to the tray 22. In such a dynamically balanced vibratory conveyor 20, the net vibratory effect on the frame 28 is reduced, so that the total weight of the structure and external support requirements may be reduced.

In accordance with this aspect of the present invention, the drive unit 50 comprises two generally oppositely disposed pole pieces, a tray pole piece 52 rigidly attached to the tray 22, and a balancer pole piece 54 rigidly attached to a kinetic balancer 56, which is in turn resiliently attached by resilient balancer support means to the frame 28. With this arrangement, as the tray 22 moves in one direction along the axis of vibration 49 under the force of the drive unit 50, the kinetic balancer 56 reacts by moving in the opposite direction, minimizing the vibrational energy that must be absorbed in the frame 28 or through the attachments 30. The details of construction and positioning of the tray pole piece 52 and the balancer pole piece 54 will be described in later portions of this disclosure, and the immediately following disclosure is concerned with the structural aspects of the dynamic balancing arrangement.

The tray pole piece 52 is rigidly attached to the tray 22, by being bolted to a tray pole piece support 58, which in turn is welded to the bottom of the tray 22. A tray pole piece support gusset 60 is welded at right angles to the support 58 and the bottom of the tray 22, to resist forces on the tray pole piece 42 which would tend to move it in the direction of the transverse axis 51. As will be described later, such forces arise when the tray pole piece 52 and the balancer pole piece 54 are energized.

The balancer pole piece 54 is supported on structure which is rigidly but adjustably attached to the kinetic balancer 56, so that the position of the balancer pole piece 54 may be adjusted relative to the tray pole piece 52. The balancer pole piece 54 is bolted to a T-shaped balancer pole piece support 62, which is formed by two pieces of steel plate welded into the shape of a T. A balancer pole piece support gusset 64 is welded at right angles to the top and the central leg of the balancer pole piece support 62, to provide structural rigidity in the direction of the transverse axis 51. As indicated previously, when the balancer pole piece 54 and the tray pole piece 52 are energized, they are attracted toward each other both along the axis of vibration 49 and the transverse axis 51, and the gussetts 60 and 64 resist and prevent responsive movement along the transverse axis by either pole piece 52 or 54.

The kinetic balancer 56 comprises a generally U-shaped structure of about the same transverse width as the frame 28. The balancer pole piece support 62 is rigidly but adjustably attached to the kinetic balancer 56, and the kinetic balancer 56 in turn is resiliently supported by, and attached to, the frame 28 by resilient balancer support means. The kinetic balancer 56 includes a pair of transversely oppositely disposed kinetic balancer side rails 66, extending parallel to the axis of vibration 49. The kinetic balancer side rail 66 is preferably a hollow rectangular steel tube, which provides lengthwise rigidity to the kinetic balancer 56 without excessive weight. Extending between the oppositely disposed kinetic balancer side rails 66 is a pair of balancer transverse spacers 76, one at each end thereof, which add rigidity to the kinetic balancer 56 and serve as the attachment and support points, as will be described. The balancer transverse spacers 76 are preferably hollow tubular steel sections having square cross-sections. Attached to each side rail 66 is an L-shaped adjustment plate support 68, which is welded to the side rail 66 and extends downwardly therefrom. The adjustment plate support is angled downwardly, to form an attachment portion 69, in the direction along the axis of vibration 49, the downward angle being away from the direction in which articles are thrown by vibration, that direction being to the right in FIG. 2.

An adjustment plate 70 is rigidly but adjustably bolted to the L-shaped flange of the attachment portion 69 of both adjustment plate supports 68, to provide a supporting surface for the balancer pole piece support 62 extending between the transversely oppositely disposed sides of the kinetic balancer 56. As illustrated in FIG. 4, the attachment plate 70 is rigidly but adjustably attached to the adjustment plate support 68 by first adjustment bolts 71 extending through first slotted holes 72 in the adjustment plate 70. By loosening the first adjustment bolts 71 and moving the adjustment plate 70 within the range permitted by the first slotted holes 72, the balancer pole piece 54 may be moved relative to the tray pole piece 52 parallel to a direction of action 73 of the drive unit 50, thereby moving the two pole pieces parallel to each other. In a somewhat similar fashion, the balancer pole piece support 62 is attached to the adjustment plate 70 by second adjustment bolts 74 through second slotted holes 75 in the adjustment plate 70. By loosening the bolts 74, the balancer pole piece support 62 may be moved in a direction parallel to the transverse axis 51, thereby changing the transverse spacing between the tray pole piece 52 and the balancer pole piece 54. The purpose of such adjustments will become apparent from the later-presented disclosure of the functioning of the drive unit 50.

The kinetic balancer 56 is attached to the frame 28 by resilient balancer support means. Preferably, such resilient balancer support means comprise a pair of balancer flexures 78, one at either end of the kinetic balancer 56, which perform a function for the kinetic balancer 56 similar to that provided for the tray 22 by the resilient tray support means, herein embodied in the tray flexures 36. That is, the kinetic balancer 56 rests at a neutral position unless acted upon by an external force. If the kinetic balancer 56 is displaced in the direction of the axis of vibration 49 by an external force, the resilient balancer support means resists this movement and provides a restoring force which progressively increases with the displacement of the kinetic balancer 56 from its neutral position. As indicated previously, in the illustrated dynamically balanced system the kinetic balancer 56 moves parallel to the axis of the vibration 49 but oppositely to the tray 22, to react the vibrational forces to reduce loadings on the frame 28. The balancer flexure 78 also resists any attempt to displace the kinetic balancer 56 in a direction parallel to the transverse axis 51.

The balancer flexure 78 is attached at its upper end to the balancer transverse spacer 76, and at its lower end to the inner transverse spacer 80. The structure of the spacers 76 and 80, and the means of attachment of the balancer flexure 78 to the spacers 76 and 80, while not critical to operation of the present invention, are preferably identical to that described previously in regard to the attachment of the tray flexure 36 to the transverse tray reinforcement 42 and the outer transverse spacer 34. The portion of the disclosure will therefore not be repeated in detail, and reference is made to the prior disclosure.

In the presently preferred and described embodiment, the tray flexures 36 and the balancer flexure 78 are equally inclined to the vertical at an angle of from about 20 to about 45°, and preferably at an angle of about 20°. This inclination allows articles in the tray 32 to be thrown forward parallel to the axis of vibration and in the direction of vibration (to the right in FIG. 2), with each vibrational cycle of the drive unit 50. Referring to the directions relative to FIG. 2, as the tray 22 is rapidly vibrated in the direction downwardly and to the left, an article in the tray falls downwardly until the tray 22 reaches its lowest point. As the tray 22 begins to move upwardly and to the right, the article is thrown in that direction forwardly to the right. As this vibrating cycle is repeated, the article is progressively moved step-by-step to the right, thence moving from the input end 24 to the delivery end 26. To achieve this cyclical vibration efficiently, the direction of action 73 of the drive unit 50 should be perpendicular to the plane of the tray flexures 36 and balancer flexures 78, as illustrated in FIG. 2.

In accordance with another aspect of the invention, the pole pieces 52 and 54 are constructed as E-shaped electromagnet means, having their coils wound on the central leg of the E, and mounted in the drive unit 50 with the pole pieces displaced along the direction of action 73 of the drive unit 50 by an amount of about the width of one of the pole piece faces. Such configuration provides improved efficiency of the drive unit 50 as compared with prior devices.

The configurations of the pole pieces 52 and 54 are essentially identical, and FIG. 5 illustrates the face of the tray pole piece 52 with a wire coil 100 wound upon a central leg 102 thereof. The materials of construction of the pole pieces 52 and 54 are well known to those skilled in the art, and are typically iron materials having low hysteresis. The tray pole piece 52 is not magnetized unless electrical current flows in the coil 100. When energized, the coil 100 induces opposite magnetic polarities in the central leg 102 and a pair of outer legs 104 of the pole piece 52.

The generally transversely opposed tray pole piece 52 and balancer pole piece 54 are illustrated schematically in FIG. 6, wherein the coil 100 is indicated only by a single turn of wire in order to better show the construction of the pole pieces. The coils 110 of the left hand side and right hand side elements are hooked oppositely to the power source, so that their simultaneous activation causes the cores upon which coils are wound to have opposite magnetic polarities so that they attract. The central leg 102 of each of the pole pieces 52 and 54 includes a central leg pole piece face 106, and the outer leg 104 of each of the pole pieces 52 and 54 includes an outer leg pole piece face 108. The width of the central leg pole piece faces 106 of each of the two pole pieces 52 and 54 are preferably substantially identical in the direction of action 73 of the drive unit 50, and the width of the outer leg pole piece faces 108 of each of the pole pieces 52 and 54 are preferably also be substantially identical in the direction of action 73 of the drive unit 50. Preferably, the width of the faces 106 and 108 should be substantially identical. In practice, widths of the faces 106 and 108 of up to about one inch have been found to give effective results, and it is believed that there is no limitation to the use of pole pieces with greater widths of the faces 106 and 108. The width of the pole piece faces 106 and 108 limits the maximum amplitude of vibration of the drive unit 50 along the axis of vibration 49.

As illustrated in FIG. 6, the pole pieces 52 and 54 are preferably offset parallel to the direction of action 73 of the drive unit 50 by an amount of about the width of the central leg pole piece face 106. That is, in this preferred embodiment the corresponding central leg pole piece faces 106 of the tray pole piece 52 and the balancer pole piece 54 are not directly opposed when the tray 22, to which the tray pole piece 52 is attached, and the kinetic balancer 56, to which the balancer pole piece 54 is attached, are at their neutral positions. Additionally, for pole pieces 52 and 54 having central leg pole piece faces 106 of width of about one inch, it is found preferable to separate the pole pieces laterally in the direction parallel to the transverse axis 51 by a pole piece separation 110 of about 1/8 inch. The amount of offset of the pole pieces 52 and 54 along the vibrational axis 49 and the separation 110 may be varied to achieve an optimum relative positioning of the pole pieces 52 and 54 by moving the adjustment plate 70 or the balancer pole piece support 70 in the manner described in relation to FIG. 4.

FIG. 7 illustrates a second embodiment of the configuration of the pole pieces. As indicated previously, when the pole pieces 52 and 54 are energized by the coils 100, the attractive forces move the pole pieces in the direction of action 73 of the drive unit 50, and also perpendicular to this direction, parallel to the transverse axis 51. The gussets 60 and 64 provide stiffening to resist this transverse force, which tends to change the pole piece separation 110. For relatively small pole pieces 52 and 54 operating with relatively low current levels in the coils 100, the transverse forces are relatively small and may be readily resisted by the gussets 60 and 64. However, if the pole pieces 52 and 54 are made larger, or if it is desired to minimize the weight of the supporting and reinforcing structure, then the alternative embodiment of FIG. 7 may be utilized to eliminate the transverse forces tending to change the pole piece separation 110, by producing equal and opposite transverse forces which cancel each other. The pole piece configuration of FIG. 7 provides for the back-to-back joining of two pairs of pole pieces of the type illustrated in FIG. 6. Any transverse forces produced by a left hand pair 112 will be reacted and neutralized by oppositely disposed forces produced by a right hand pair 114. Additionally, the pole piece configuration of FIG. 7 provides an increased power level to vibrate the tray 22. As with the embodiment of FIG. 6, it is again preferable to offset a central pole piece 116 with respect to the outer pole pieces 118 along the direction of action 73 of the drive unit 50 by an amount of about the width of the outer pole piece face 120. With the configuration of FIG. 7, the outer pole pieces 118 move one of the tray 22 or kinetic balancer 56, while the central pole piece moves the other.

Another embodiment of the pole piece configuration which achieves increased power level, without the doubled total transverse width of the configuration of FIG. 7, is shown in FIG. 8. In FIG. 8, two pairs of pole pieces such as those shown in FIG. 6 are joined together in an end-to-end fashion. This configuration achieves the increased vibrational power capacity of the doubled unit of FIG. 7, without the increased transverse width of the unit illustrated in FIG. 7, but at the cost of sacrificing the balancing of transverse forces inherent in the embodiment of FIG. 7. In some conveyors 20, it may be desirable to achieve the increased power level in a drive unit 50 of relatively narrow width, and the configuration of FIG. 8 provides this structure. Again, it is desirable to offset the opposed pole pieces in the direction of action 73 of the drive unit 50 by an amount equal to the width of the central leg pole piece face 106.

The pole piece configurations described in relation to FIGS. 6–8 relate to drive units for periodically applying force to power vibration in one direction. Referring to FIG. 6, the left hand pole piece moves relatively downwardly and the right hand pole piece moves relatively upwardly when the coils 100 are energized. Thus, there is a unidirectional application of force. To achieve bidirectional application of force along the direction of action 73, two pole piece pairs 122 and 124 may be joined end-to-end with an oppositely disposed separation of the two, as illustrated in FIG. 15. When the drive of FIG. 15 is powered by a drive controller in a manner to be described, the two oppositely displaced pole piece pairs 122 and 124 are energized in a manner so that the pair 122 drives the tray 22 in one direction and the pair 124 drives in the other. The power input per cycle is thus increased.

The basic structure of the pole piece is that illustrated in FIGS. 5 and 6. Modifications such as those shown in FIGS. 7, 8, and 15 may be made to achieve specific advantages and characteristics, as indicated. Other modifications of the basic structure may be made by those skilled in the art.

In accordance with another aspect of the invention, the power signal to the coils 100 of the drive unit 50 is provided as a sequence of pulse trains. The pulse trains have a lower frequency than that of the 50 or 60 cycle AC power typically available at most industrial sites. By utilizing the apparatus next described, the frequency and duration of each pulse train may be controlled, thereby providing control over the frequency and vibrational amplitude (length of stroke) of the drive unit 50.

As illustrated in FIG. 9 for a preferred embodiment, a drive controller 200 for producing a power signal to the drive unit 50 includes a power module 202 and a control module 204. The power module 202 includes a relay 206 having a high current side capable of carrying the maximum voltage and current required by the drive unit 50. A variable autotransformer 208 is placed in series with the high current side of the relay 206 to controllably reduce the voltage of the alternating current 210 delivered to the drive unit 50, so that the total power level of the power signal, denoted by the letter B in FIGS. 9 and 10, may be readily adjusted, without varying either the frequency or amplitude of the pulse train.

The control module 204 delivers a control signal, denoted by the letter A in FIG. 9, to the power module 202 to control the opening and closing of the relay 206. That is, the signal A is provided to the low current or control side of the relay 206. As illustrated in FIG. 10, the signal A is an on-off type signal, which closes the relay 206 for a controllable period of time, thereafter opens the relay 206, and then again closes the relay 206 after a controllable period of time. This sequence of the control signal A is then repeated, to produce a wave form as illustrated by A in FIG. 10.

The closing and opening of the relay 206 in the power module 202, in accordance with signal A, when applied to an alternating current signal 210, results in the power signal illustrated by the letter B in FIGS. 9 and 10. The signal B in FIG. 10 consists of a series of pulse trains 212 whose frequency and duration may be directly controlled by varying frequency 214 and duration 216 of the square wave pulses of signal A.

In a most preferred embodiment of the invention, the relay 206 in the power module 202 is a model D4825 Series 1 SCR Output solid state relay manufactured by International Rectifier Corp., El Segundo, Calif. Such a relay carrys a maximum current of 25 amps at a voltage of 480 volts on the high current side. The relay is activated by a signal A of 3-32 volts DC and a current of about 3 milliamps. The choice of the relay 206 and the variable autotransformer 208 will depend upon the power consumption of the drive unit 50 and the maximum power level provided in the AC signal 210.

FIG. 11 illustrates a most preferred embodiment of the electronic circuitry contained within the control module 204, to produce a signal A provided to the power module 202, as illustrated in FIGS. 9 and 10. The most preferred embodiment of the circuitry utilizes a 556 dual timer integrated circuit, this integrated circuit comprising two circuits on a single chip. The first circuit is an astable RC timer producing a continuous periodic triggering signal of controllable frequency, and the second circuit is a monostable RC timer producing a train of DC pulses comprising signal A, having a frequency determined by the continuous periodic triggering signal and a controllable pulse width. Such a chip is denoted by the block 300 in FIG. 11, whereby these circuits are not shown or described herein in terms of discrete electronic components. Specifically, the above referenced 556 dual timer integrated circuit may be obtained from many commercial sources, such as, for example, Hamilton Electronic Company, Culver City, Calif., which sells such integrated circuits manufactured by numerous manufacturers such as Signetics Corporation of Sunnyvale, Calif.

Specifically, the circuit of FIG. 11 provides for a frequency adjustment or tuning control 302 on the astable RC timer side of the 556 chip. Also provided is a pulse width adjustment 304 on the monostable RC timer side of the 556 chip. To control the frequency 214 of the signal A, the potentiometer 302 is set to a charging current which determines the time required to charge the capacitor 306 to a threshold level voltage to be applied to the pin 2 of the chip 300. When this voltage reaches a value equal to a fixed percentage of a supply voltage applied to pin 4, a discharge transistor switch located within the chip 300 is closed to discharge the capacitor 306 through pin 1 of the chip 300. When the voltage on the capacitor 306 reaches a low level, the signal provided to pin 6 opens the internally contained transistor switch, allowing the capacitor 306 to be recharged so that the cycle repeats. When the internal transistor switch closes, a triggering signal is produced on pin 5. This continuous periodic triggering signal produced at pin 5 determines the frequency 214 of the signal A provided to the power module 202.

The duration 216 of the pulse of the signal A is determined by providing the signal from pin 5 to the triggering pin 8 of the monostable RC timer side of the 556 chip 300. Upon triggering of the pin 8, the capacitor 308 begins to charge until the voltage on pin 12 of the chip 300 reaches a preset percentage of the supply voltage. At this point, a second internal transistor switch is closed, so that the voltage begins to discharge through the pin 13 to ground. The time required to accomplish the charging of the capacitor 308 is determined by setting the potentiometer of the pulse width adjustment 304. An internal flip-flop signal converts this internal RC exponentially increasing signal to a square wave, which is provided as an output at pin 9 of the integrated chip 300. Thus, the setting of the potentiometer adjustment 304 determines the pulse width or duration 216 of the signal A applied to the power module 202. By utilizing this preferred embodiment of the circuitry included within the control module 204, the frequency 214 and the pulse duration 216 of the signal A may be readily controlled by simply adjusting the potentiometers 302 and 304. The exact values of the resistances and capacitances of the circuit elements illustrated in FIG. 11 will depend upon the characteristics of the range of capability required to drive a particular vibratory conveyor 20, and the selection of such circuit elements will be known to those skilled in the art.

The just-described embodiment deals with a drive unit 50 operating from a single phase power source and providing a pulse to the tray 22 only in one direction. The drive controller 200 may be readily modified to allow utilization of three-phase power to the pulse the tray 22 in a single direction by utilizing the same control module 204 and a power module having three lines and three relays, all being actuated by the signal A.

The embodiment of the drive controller illustrated in FIGS. 9–11 drives the tray 20 only in a single direction and the return toward the neutral position is provided only under the impetus of the tray flexures 36 and the balancer flexures 78. In some instantaneous, it may be desirable to pulse the tray 12 in both directions as previously described for a bidirectional drive, and in relation to FIG. 15, so as to increase the power input to the vibratory conveyor 20 during each cycle.

Figure 13:
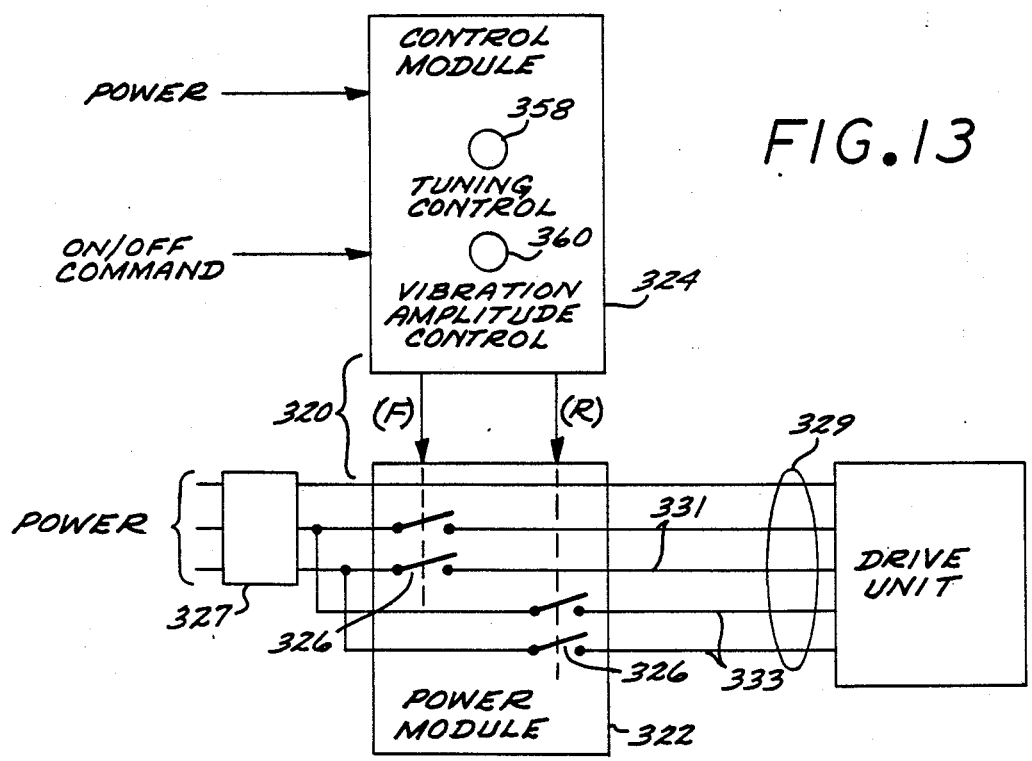
FIG. 13 is a schematic illustration of a second embodiment of a drive controller, whereby the drive is driven in both forward and reverse directions.

FIG. 13 presents a presently preferred embodiment of a drive controller 320 for achieving pulsing both in the forward and reverse directions, comprising a power module 322 and a control module 324. In this particular illustrated embodiment of FIG. 13, three phase AC power is utilized to provide the energy for the power signal provided to the drive unit 50. The principles of the drive controller 320 are generally similar to the principles of the drive controller 200 illustrated in FIG. 9, but the control module 324 provides two pulsed signals to the power module 322, and these pulsed signals are then applied to periodically interchange two of the three phases of the alternating current power input. Thus, the drive controller 320 utilizes the principles of a solid state reversing starter to achieve sequenced pulsing of the drive unit 50 in both the forward and reverse directions. The power module 322 utilizes two pairs of relays 326 to achieve the interchanging of the two phases of the three-phase input power. The relays 326 may be of standard construction, as, for example, described above for relay 206. Optionally, a threephase variable autotransformer 327 may be provided in a fashion similar to the autotransformer 208 of FIG. 9. The power signal on lines 329 is thereby controllable and is provided to a drive 50, as for example, as illustrated in FIG. 15, by providing the F-pulsed signal 331 to pole pieces 122 and the R-pulsed signal 333 to the pole pieces 124.

Figure 14:
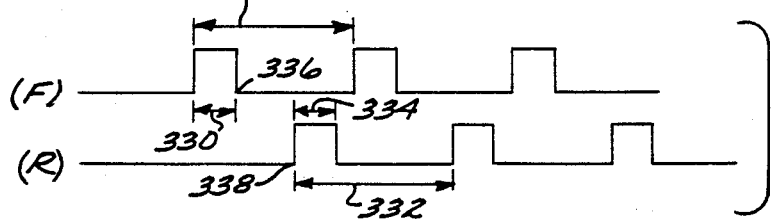
FIG. 14 is a schematic illustration of the forward F and reverse R signals produced by the drive controller of FIG. 13.

Because the drive controller 320 pulses the drive unit 50 in both directions parallel to the vibrational axis 49, two control signals, labelled F and R in FIG. 13 must be provided to the power module 322 by the control module 324. The letter F denotes the forward pulse, while the letter R denotes the reverse pulse, and the interrelationship between these pulses is schematically illustrated in FIG. 14. As with the embodiment of FIGS. 9–11, the frequency 328 and the pulse duration 330 may be controllably adjusted by the setting of potentiometers in the control module 324. As illustrated in FIG. 14, it is preferred that the frequency 328 of the F signal be identical with that of the frequency 332 of the R signal, and that the pulse duration 330 of the F signal be identical to the pulse duration 334 of the R signal. In the embodiment illustrated in FIG. 14, there is preferably a gap provided between a termination 336 of the pulse in one direction and an initiation 338 of the pulse in the opposite direction. This gap should correspond to one-half cycle of the 60 cycle alternating current to avoid shorting of the lines in the power module 322.

The F and R signals of FIG. 14 must be thus coordinated, and electronic circuitry for producing such signals F and R is within the knowledge of those skilled in the art. Any of several approaches to the electronic circuitry of the control module 324 may be taken, and FIG. 12 illustrates a presently most preferred embodiment of this circuitry.

Figure 12:
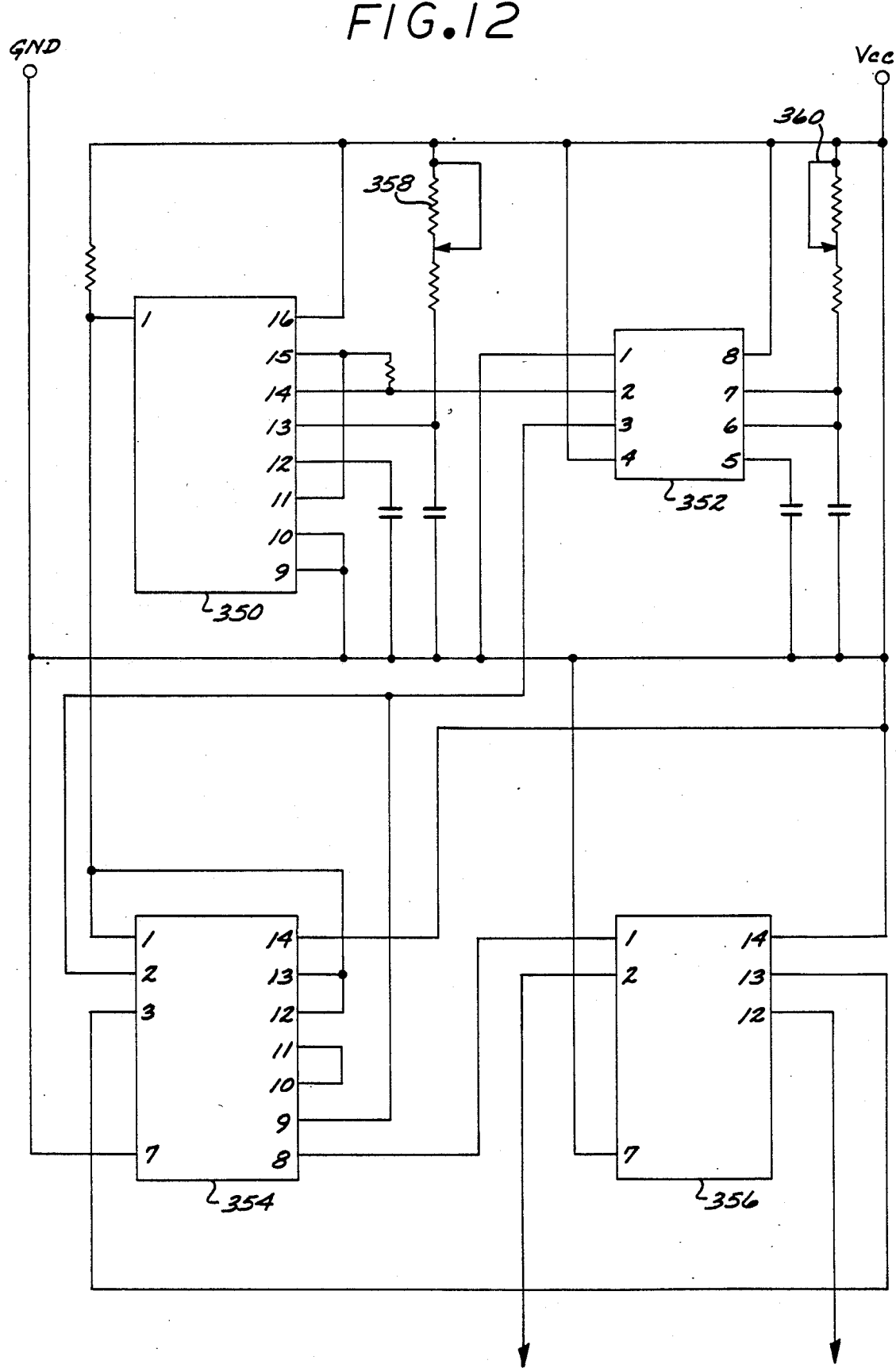
FIG. 12 is a circuit diagram of a second embodiment of the pulse train control circuitry of a drive controller, for driving the drive in both forward and reverse directions.

The control module 324 comprises electronic circuitry built around four integrated circuit chips illustrated in block form in FIG. 12, whereby these circuits are not shown or described herein in terms of discrete electronic components. The integrated circuits of FIG. 12 include a model 2240 binary programable timer/counter, represented by numeral 350; a 555 timer, represented by numeral 352; a 7400 Quad 2-input NAND gate represented by numeral 354; and a 7406 Hex Inverter, Driver, represented by numeral 356. All of these integrated circuits are available commercially, such as for example from Hamilton Electronics Company, Culver City, Calif. The 555, 7400, and 7406 integrated circuits are manufactured by Signetics Corporation, Sunnyvale, Calif., and the 2240 integrated circuit is manufactured by Exar Integrated Systems, Inc., Sunnyvale, Calif.

The circuit of FIG. 12 functions in many respects in a manner comparable to the circuit of FIG. 11 to produce a basic pulsed DC signal, but further utilizes digital logic to create a series of F and R pulses supplied to the power module 322. As such, the circuit of FIG. 12 is most clearly described in reference to the comparable signals produced by the circuitry of FIG. 11, further describing the logical processing of such signal. The 2240 binary programable timer/counter includes an astable RC timer producing a continuous periodic triggering signal of controllable frequency, in the same manner as the corresponding element of the 556 dual timer integrated circuit. This continuous periodic triggering signal is supplied to the monostable RC timer on the 555 timer chip 352. In a manner comparable with the monostable RC timer circuit of the 556 chip 300, the 555 timer chip 352 produces a train of DC pulses on pin 3. In the same manner as with the signal produced by the 556 chip 300, the frequency of the output signal of the 555 chip 352 may be controlled by adjusting the frequency control potentiometer 358, and the pulse duration may be controlled by adjusting the pulse duration potentiometer 360. Once this basic DC pulse signal is obtained, the F and R signals may be generated by a counting signal produced by pin 1 of the 2240 chip 350, logically processed with the output signal from pin 3 of the 555 chip 352, in the 7400 chip 354. Using internal circuitry, the chip 352 first inverts the counting signal from pin 1 of the chip 350, so that both the counting signal and its inverse are available for logical functions (at pins 1 and 11, respectively). The F pulse supplied to the power module 352 is the result of the logical ANDing of the counting signal of pin 1 and the output signal from pin 3 of the chip 352 as supplied on pin 2 of the chip 354, and thence supplied as an output signal on pin 3 of chip 354. The R signal supplied to the power module 324 is the result of the logical ANDing of the inverse of the counting signal supplied to pin 10 of the chip 354 and the output signal of the chip 352 supplied to pin 9 of the chip 354. The resulting signal R is available on pin of the chip 354.

The signals from pins 3 and 8 of the chip 354 are of the necessary voltage but are of too low a power level to drive typical relays 326 of the power module 322. These signals are therefore supplied to the open collector driver chip 356 to have their power levels boosted to a level sufficient to drive the relays 326. The R and F signals supplied to the power module 322 are thence available on pins 2 and 12 respectively, of the chip 356.

The drive and drive controller of the present invention can thus be adapted to provide either forward or forward and reverse driving of the tray 22, and using either one or multiple-phase power, alternating or direct current power, and a variety of pole piece configurations within the scope of the present invention. The pulsed power approach allows a control of the frequency and vibration of amplitude so as to achieve optimum tuning of the conveyor. Moreover, by adjusting the frequency and vibration properly in the embodiment having the pulsed power signal provided to both pole pieces, an increased length of stroke is achieved by comparison with prior drives wherein one pole piece had a constant magnetic field. In such a device, the motion of the pole pieces is restricted so that the pieces cannot relatively travel far past the point where the pole faces are directly opposed. By cutting the power during the "off" portion of the pulse in the present invention, the pole pieces are allowed to travel past the point of direct opposition of the pole faces under the influence of inertia, thereby lengthening each stroke before the restoring force becomes significant. The ability to pulse bidirectionally similarly allows this longer stroke.

Further, mounting the two pole pieces to the tray and the kinetic balancer, respectively, in one embodiment, provides important advantages over the art. In a prior device, a mechanical linkage to the tray was mounted on the kinetic balancer, with a drive belt to a motor on the frame. Such an approach did not use a drive having pole faces moving parallel to each other, and the complicated linkage and belt drive were subject to mechanical maintenance problems. Also, only the frequency but not the amplitude of vibration could be redily controlled. The present invention overcomes these problems, as there is no mechanical linkage between the tray and the kinetic balancer, and between the balancer and the frame. The forces exerted between the tray and the balancer are magnetic, and only electrical wires extend to the tray and the balancer. The relative weights of the tray and balancer may also be varied more easily without concern for destructive harmonic vibrations set up in the mechanically interlinked parts.

It will now be appreciated that, through the use of this invention, a controllable vibratory conveyor of high efficiency may be constructed. Although a particular embodiment of the invention has been described for purposes of illustration, various modifications may be made without departing from the spirit and scope of the invention. Accordingly, the invention is not to be limited except as by the appended claims.

What is claimed is:

1. A vibratory material conveyor comprising a frame, an elongated tray for receiving and conveying material along a linear path, resilient mounting means for supporting the tray from the frame and for permitting vibration of the tray along the linear path, electro-magnetic driving means having at least one pair of electrically energizable opposed pole pieces where one pole piece is rigidly connected to the tray and the second pole piece is connected to the frame, an electrical power supply carrying an alternating current at a standard mains voltage and frequency, and a drive controller means for electrically connecting the power supply to the electro-magnetic means for virbating the tray, wherein the drive controller means comprises:

means for periodically turning the alternating current on and off from the power supply to the electro-magnetic driving means; and user control means for setting a duration for timed bursts of alternating current at the standard mains voltage and frequency delivered to the electro-magnetic driving means and for tuning the electro-magnetic driving means to a harmonic frequency at or near a natural harmonic frequency of the tray when vibrating.

2. In the vibratory material conveyor according to claim 1, wherein the drive controller means further comprises a variable autotransformer means for adjusting the voltage of the timed bursts of alternating current delivered to the electro-magnetic means at the frequency of the power supply.

3. In the vibratory material conveyor according to claim 2, wherein the means for periodically turning the alternating current on and off comprises a dual timer integrated circuit and a high voltage relay electrically connected to the variable autotransformer, the circuit having means for delivering timed control signals to the relay for opening and closing the relay.

4. In the vibratory material conveyor according to claim 1, wherein the power supply has a three-phase alternating current, and wherein the drive controller means further comprises means in two of three power lines for periodically turning the three-phase alternating current on and off sequentially in the two power lines and interchanging two of the three phases of timed sequential bursts of alternating current delivered to the electro-magnetic means, and wherein the user control means sets the duration for timed sequential bursts of alternating current at the frequencies of the two of the three-phase alternating current in respective lines of the two lines.

5. In the vibratory material conveyor according to claim 4, wherein the drive controller means further comprises a three-phase variable autotransformer for adjusting the voltage of the timed sequential bursts of alternating current delivered in the respective lines of the two lines to respective ones of the pair of pile pieces.

6. In the vibratory material conveyor according to claim 5, wherein the means for periodically turning the three-phase alternating current on and off includes an electronic circuitry having four integrated circuit chips comprising a timer/counter, a timer, an NAND gate and a hev inverter driver and two high voltage relays electrically connected to the three-phase autotransfer and in parallel to the two power lines, the NAND gate delivering timed control signals to an open collector driver chip means for boosting the control signals to a level sufficient to drive the relays.

7. In the vibratory material conveyor according to claim 1, wherein the opposed pole pieces are displaced from one another in the direction of the linear path.

8. In the vibratory material conveyor according to claim 7, wherein the electro-magnetic driving means includes a second pair of opposed pole pieces arranged bilaterally symmetrical with the one pair of opposed pole pieces and means for delivering the timed bursts of alternating current to the two bilateral symmetrical pairs of opposed pole pieces.

9. In the vibratory material conveyor according to claim 7, wherein the electro-magnetic driving means includes a second pair of opposed pole pieces arranged end to end with the one pair of opposed pole pieces.

10. The vibratory material conveyor according to claim 9, wherein a spacer is interposed between one of the end-to-end arranged pole pieces for separating the pole pieces.

11. In the vibratory material conveyor according to claim 1, wherein the electro-magnetic driving means include an elongated kinetic balancer below the tray resiliently connected to the frame, and wherein the second pole piece is rigidly connected to the kinetic balancer, and the one pole piece is rigidly connected to the bottom of the tray.

12. In the vibratory material conveyor of claim 1, wherein each of said pole pieces has a coil wound thereon, and both coils are simultaneously energized so as to produce opposite polarities.

13. In the vibratory material conveyor of claim 8, wherein each of said pole pieces has a coil wound thereon, and both coils are simultaneously energized so as to produce opposite polarities.

14. In the vibratory material conveyor of claim 9, wherein each of said pole pieces has a coil wound thereon, and both coils are simultaneously energized so as to produce opposite polarities.

15. In the vibratory material conveyor of claim 10, wherein each of said pole pieces has a coil wound thereon and both coils are simultaneously energized so as to produce opposite polarities.

16. In the vibratory material conveyor of claim 7, wherein each of said pole pieces has a coil wound thereon, and both coils are simultaneously energized so as to produce opposite polarities.

17. In the vibratory material conveyor according to claim 4, wherein the opposed pole pieces are displaced from one another in the direction of the linear path.

18. In the vibratory material conveyor according to claim 17, wherein teh electro-magnetic driving means includes a second pair of opposed pole pieces arranged bilaterally symmetrical with the one pair of opposed pole pieces, and means for delivering the timed bursts of alternating current to the two bilateral symmetrical pairs of opposed pole pieces.

19. In the vibratory material conveyor of according to claim 17 wherein the electro-magnetic driving means includes a second pair of opposed pole pieces arranged end to end with the one pair of opposed pole pieces.

20. In the vibratory material conveyor according to claim 17, wherein a spacer is interposed between one of the end-to-end arranged pole pieces for separating the pole pieces.

21. In the vibratory material conveyor according to claim 4, wherein the electro-magnetic driving means include an elongated kinetic balancer below the tray resiliently connected to the frame, and wherein the second pole piece is rigidly connected to the kinetic balancer, and the one pole piece is rigidly connected to the bottom of the tray.

22. In the vibratory material conveyor of claim 18, wherein each of said pole pieces has a coil wound thereon, and both coils are simultaneously energized so as to produce opposite polarities.

23. In the vibratory material conveyor of claim 19, wherein each of said pole pieces has a coil wound thereon, and both coils are simultaneously energized so as to produce opposite polarities.

24. In the vibratory material conveyor of claim 20, wherein each of said pole pieces has a coil wound thereon, and both coils are simultaneously energized so as to produce opposite polarities.

25. In the vibratory material conveyor of claim 17, wherein each of said pole pieces has a coil wound thereon, and both coils are simultaneously energized so as to produce opposite polarities.

26. In a vibratory conveyor system for conveying articles or other products having a frame, an elongated tray having a generally U-shaped cross-section, for receiving articles or products, said tray having a longitudinal axis, resilient means for supporting the tray from the frame at a neutral position, the resilient tray support means being flexible and producing a restoring force on the tray when the tray is displaced along its longitudinal axis from the neutral position, an improved control system therefore, comprising:
 (a) an electro-magnetic drive means including a pair of electrically energizable opposed pole pieces for vibrating the tray along its longitudinal axis to cause the movement of the received articles or products along the length of the tray, one of said pair of pole pieces being connected to said frame and the other of said pair of pole pieces being connected to said tray;
 (b) a user-operated drive controller having means for supplying alternating current at a standard mains voltage and frequency from an AC electrical power source to electro-magnetic drive means, means for varying the mains voltage supplied to the electro-magnetic drive means, means for periodically turning the alternating current on and off from the voltage varying means to generate bursts of alternating current to the electro-magnetic drive means, and user control means having means for setting the frequency of the alternating current bursts to a harmonic frequency at or near the natural harmonic frequency of the system less than the frequency of the AC electrical power source; and
 (c) means for supplying the alternating current bursts alternatively to each of said pair of pole pieces of the electro-magnetic drive means to control the vibrational frequency of the drive means.

* * * * *